United States Patent Office — 3,076,831 — Patented Feb. 5, 1963

3,076,831
MANUFACTURE OF CRYSTALLINE ZIRCONIUM TETRAACETATE
Wilhelm Brugger, Essen, Germany, assignor to Th. Goldschmidt A.-G., Essen, Germany
No Drawing. Filed July 5, 1960, Ser. No. 40,535
Claims priority, application Germany Jan. 29, 1960
9 Claims. (Cl. 260—429.3)

This invention relates to improvements in the manufacture of anhydrous crystalline metallic tetraacetates and more particularly relates to an improvement in the manufacture of anhydrous crystalline zirconium tetraacetate.

The salts of organic acids and metals of the IV group of the periodic table have recently acquired more and more technical importance. In particular, the salts of acetic acid and zirconium and hafnium are used industrially in the dyeing, finishing and printing of textiles. However, the methods heretofore available for the preparation of these salts have been unsatisfactory in that a substantially pure crystalline product capable of storage, i.e., having a prolonged shelf life could not be obtained in technically satisfactory yields.

According to a known method proposed, zirconyl acetate is prepared by dissolving freshly precipitated zirconia hydrate $ZrO_2 \cdot xH_2O$ in acetic acid. A disadvantage of this method, however, is that it is not possible to dissolve the zirconia hydrate in acetic acid quantitatively, so that the zirconyl acetate obtained, $$ZrO(CH_3COO)_2 \cdot xH_2O$$

contains considerable amounts of insoluble components, which greatly impair its subsequent utilization. In contrast to zirconia hydrate ($ZrO_2 \cdot xH_2O$), zirconyl hydroxide $ZrO(OH)_2 \cdot xH_2O$ dissolves substantially quantitatively in acetic acid. Zirconyl hydroxide, however, cannot be produced by simple precipitation from the usual zirconium salts, and further zirconyl hydroxide must be freshly used as it ages very quickly, being transformed into zirconia hydrate and thus it becomes to a considerable extent, insoluble in acetic acid.

According to another method, it has been suggested that zirconium salts of organic acids can be prepared starting from the zirconium alkoxides. Thus one obtains for example by reaction of zirconium tetrabutoxide $Zr(C_4H_9O)_4$ with an excess of acetic acid, zirconium acetate, butyl acetate being formed as by-product from the alkoxy groups of zirconium butoxide and acetic acid.

According to this method, there is required as a starting reagent the expensive zirconium butoxide or another equally costly zirconium alkoxide, however, only basic, polymeric trisoaps are obtained as final products, that is, zirconium oxytriacetates.

For this reason, a large portion of the textile industry prefers to use, despite the many disadvantages associated therewith in place of zirconyl acetate, a basic highly hydrated zirconium carbonate (carbonated hydrous zirconia), which zirconium carbonate is soluble in acetic acid only when freshly precipitated and transformed into a dilute aqueous zirconyl acetate solution by dissolution in aqueous acetic acid immediately before use.

The disadvantage of this procedure lies chiefly in the fact that the basic zirconium carbonate, although it is marketed in the form of a highly aqueous paste cannot be satisfactorily used since it gradually undergoes changes in its composition during storage, whereby more and more components insoluble in acetic acid are formed.

Furthermore carbonated hydrous zirconia, as it is technically produced, is contaminated with alkali, thus resulting hydrolysis on heating gently the solutions of zirconylic acetate prepared from the carbonated hydrous zirconia and acetic acid.

Finally it is also known that zirconium tetrachloride can be transformed into zirconium acetate by reaction with anhydrous acetic acid. The disadvantage of this procedure lies in that it is very difficult to substitute all four chlorine atoms of the zirconium tretrachloride with acetate radicals. The same is true in the case of titanium tetrachloride. Two chlorine atoms can, as is known, easily be substituted by acetate radicals, however, the zirconyl or chlorozirconyl structure thereby formed is particularly stable and further introduction of acetate radicals is not easily accomplished. The reaction of zirconium tetrachloride with anhydrous acetic acid with elimination of all four chlorine atoms and formation of the tetraacetate requires an extremely long reaction time while heating the liquid under refluxing.

Because of the known catalytic properties of the zirconium compound for water-eliminating reactions, there takes place to a small degree a formation of acetic anhydride from the excess acetic acid and consequently a formation of basic polymeric zirconyl acetates which do not have the ability to crystallize and precipitate only in part as amorphous solid phase with the monomeric zirconium acetate upon cooling. This makes the entire solid phase slimy or viscous, and due to its adsorption properties any impurities which would otherwise remain in the dissolved phase are entrained into the preparation thus produced.

It is therefore an object of this invention to provide means conducive to an improved process for the manufacture of anhydrous metallic tetraacetates and in particular zirconium and hafnium tetraacetates without the above mentioned disadvantages.

Another object of this invention concerns an improved process for the manufacture of anhydrous crystalline zirconium tetraacetate which is capable of being stored and which retains free flowing properties without subsequent drying.

Still another object of this invention is the production of anhydrous crystalline zirconium tetraacetate from acetic acid and zirconium chlorides in an extremely pure and monomeric form.

These and other objects will appear from the description of the invention herein below.

In accordance with the invention crystalline metallic tetraacetates of the general formula $M(CH_3COO)_4$ wherein M is zirconium or hafnium are prepared by dissolving in a first step at about 50 to 65° C., one of $ZrCl_4$ or $HfCl_4$ with surplus acetic acid, whereby two chlorine atoms have been replaced by acetate radicals and two equivalents of hydrogen chloride are evolved and a solution of a complex of the formula $$MCl_2(CH_3COO)_2$$

is formed in which M has the same meaning as above, the complex being in the form of a complex with acetic acid.

In a second step, to the solution of the dichloro zirconyl acetic acid complex is added at about 50 to 65° C. acetic anhydride under stirring, whereby further hydrogen chloride is split off, thus forming a monochloro compound corresponding to the formula $$MCl(CH_3COO)_3$$

in which M has the same meaning as above, said monochloro compound of $MCl(CH_3COO)_3$ being in the form of a complex with acetic acid.

In a third step, the solution of the complex monochloro compound is heated until the mixture of the surplus acetic acid and hydrogen chloride is driven off and the anhydrous tetraacetate $M(CH_3COO)_4$ is formed. The metal tetraacetate is formed as a crystalline precipitate and may be recovered by the conventional methods.

Thus in accordance with the invention, it has been found that a metal tetrachloride and preferably zirconium tetrachloride can be dissolved only in an organic acid with the prompt elimination of about 2 chlorine atoms which acid because of its acid hydrogen permits the formation of the metaloxychloro and preferably the chlorozirconyl structure. After the dissolution has taken place, it suffices to reduce the concentration of the acid hydrogen ions present in the reaction solution for the substitution of the other chlorine atoms in the metal tetrachloride and preferably zirconium tetrachloride to take place in fairly rapid reaction sequence.

The treatment in accordance with the invention is effected with particular advantage by dissolving for example zirconium tetrachloride in anhydrous acetic acid while gently heating to 50 to 60° C., there being formed in about 10 to 20 minutes two chlorine atoms with violent evolution of hydrogen chloride and formation of the dichlorozirconyl acetate or formation of chlorozirconyl acetates.

Thereafter, all visible reaction ceases. These chlorozirconyl acetates are in actuality complexes of the dichloro compound with acetic acid, i.e., chlorozirconyl-acetatoacetic acids, which in turn are hydrolyzed into hydrogen ions and chlorozirconyl acetate ions:

$$ZrCl_4 + (2+n)CH_3COOH$$
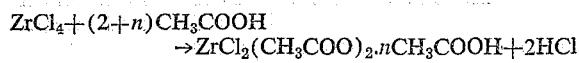
$$\rightarrow ZrCl_2(CH_3COO)_2 \cdot nCH_3COOH + 2HCl$$

The probable value of $n$ is approximately from 3 to 5.

By addition of acetic anhydride to the reaction mixture containing the dichloro complex there occurs at a temperature of 50 to 60° C. again a violent evolution of hydrogen chloride, because by this addition of acetic anhydride, the total concentration of the hydrogen ions is reduced, so that the complex of the dichlorozirconyl acids is destroyed and a complex of monochlorotriacetatozirconylacetic acid is formed substantially as follows:

$$ZrCl_2 \cdot (CH_3COO)_2 \cdot nCH_3COOH$$
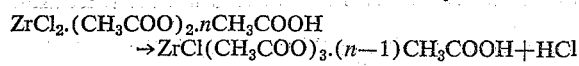
$$\rightarrow ZrCl(CH_3COO)_3 \cdot (n-1)CH_3COOH + HCl$$

By this reaction the acetic anhydride is not changed. For the elimination of the fourth chlorine atom of the monochlorotriacetatozirconyl acid now present, the liquid reaction mixture is heated, so that a mixture of acetic acid and hydrogen chloride is distilled over, at which by the resulting renewed decrease of the hydrogen ion concentration the complex of the monochlorotriacetatozirconyl acetic acid is destroyed.

There then forms the zirconium tetraacetate, which now no longer forms a complex with free acetic acid.

$$ZrCl(CH_3COO)_3 \cdot (n-1)CH_3COOH$$
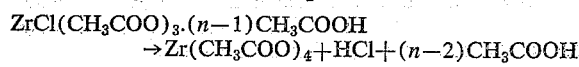
$$\rightarrow Zr(CH_3COO)_4 + HCl + (n-2)CH_3COOH$$

The rapid progress of this reaction is visible from the fact that already shortly after distillation of the reaction mixture is started, the zirconium tetraacetate, which is relatively insoluble in acetic acid or in acetic anhydride, begins to precipitate out. The liquid, i.e. acetic acid and hydrogen chloride and a small portion of acetic anhydride is distilled over until the volume of the distillate recovered is equal to the volume of the acetic acid originally required for the dissolution of the zirconium tetrachloride. After cooling the resulting crystalline paste, the zirconium tetraacetate is suction-filtered and dried with exclusion of atmospheric moisture at about 80 to 90° C.

Since zirconium compounds possess strong catalytic properties for reactions in which water is eliminated, it has been found desirable according to a preferred embodiment of the invention to employ reduced pressures of about 40 to 50 mm. Hg in the distillation required to bring the substitution of the fourth chlorine atom by the acetate radical, as the mixture of hydrogen chloride and acetic acid can then be distilled over at about 60° C. By this measure, the formation of polymeric zirconium acetates is completely avoided, so that yields of 98%, referred to the zirconium tetrachloride initially employed can be obtained.

According to another embodiment the last stage of the process can be carried out in a manner that the distillation for the removal of the acetic acid and of the hydrogen chloride is completed when only about two thirds of the liquid volume which corresponds to the acetic acid originally used for the dissolution is distilled over. Thereafter the small residual chloride content can be removed in the form of elementary chlorine by oxidation with an oxidizing agent as for example with hydrogen peroxide. A corresponding portion of the acetic anhydride is then saponified to acetic acid. By subsequently briefly heating the paste containing the tetraacetate to about 110 to 120° C. under atmospheric pressure, the entire paste is rendered completely free of chlorine. When operating without an oxidizing agent, i.e., the hydrogen peroxide, the zirconium tetraacetate recovered usually still contains 0.03 to 0.1% of chlorine.

Instead of zirconium tetrachloride zirconium chlorides such as zirconium oxychloride $$ZrOCl_2 \cdot 8H_2O \text{ or } ZrOCl_2 \cdot 6H_2O$$

or a lesser hydrated oxychloride may be used in the process according to the invention for the production of crystalline zirconium tetraacetate.

If the starting material is an oxychloride, the same is charged in solid form into the acetic anhydride, with formation of monochlorotriacetatozirconyl acid in an intensely exothermic reaction with the elimination of hydrogen chloride, a quantity of acetic anhydride equivalent to the water and oxide content of the oxychloride being at the same time saponified to acetic acid. The reaction scheme is as follows:

$$ZrOCl_2 \cdot 6H_2O + 7(CH_3CO)_2O \rightarrow ZrCl \cdot$$
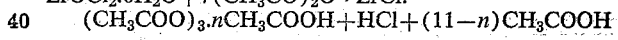
$$(CH_3COO)_3 \cdot nCH_3COOH + HCl + (11-n)CH_3COOH$$

The free acetic acid which is formed in this reaction then furnishes the concentration of hydrogen ions required for the formation of the monochlorotriacetatozirconyl acetic acid. Thereafter the free acetic acid is distilled over at 60° C., preferably at a pressure of 40 to 50 mm. Hg, zirconium tetraacetate being formed with elimination of hydrogen chloride.

In this embodiment of the process according to the invention, acetic anhydride instead of acetic acid is consumed, and this the more as the starting zirconium oxychloride material contains more water. When using polymeric, basic, and extremely water-poor oxychlorides, i.e., $Zr_3O_4Cl_2 \cdot 3ZrOCl_2 \cdot 8H_2O$, the amount of free acetic acid formed by saponification upon reaction with acetic anhydride is not sufficient to permit the formation of the complex monochlorotriacetatozirconylacetic acid, so that in this case the basic, polymeric, and extremely water-poor zirconium oxychloride is reacted with a mixture of acetic acid and acetic anhydride.

When using basic oxychlorides, there are formed upon dissolution in a mixture of acetic acid and acetic anhydride, in part, polymeric complex acetatozirconyl acids which, however, are transformed into monomeric zirconium tetraacetate upon distillation of the excess acetic acid under the influence of the increasing concentration of acetic anhydride during this distillation.

Also when using zirconium oxychloride for the production of zirconium tetraacetate, the removal by distillation of the free acetic acid may, of course, be terminated at an early stage, and the last residue of chlorine may then, as described above, be removed by oxidation with hydrogen peroxide or another oxidizing agent as for example peracetic acid.

By the process according to the invention, relatively large amounts of zirconium tetraacetate can be produced in the reaction vessels, as the last stage, the substitution of the fourth or last chlorine atom by the acetate radical, occurs, satisfactorily in heterogeneous phase.

The product obtained by the method according to the invention is in all cases an anhydrous crystalline tetraacetate which does not change upon storage.

For this reason this compound cannot undergo transformation when stored under exclusion of moisture. Because of its crystalline structure, the adsorption properties are so low that any impurities of the starting zirconium halide starting material, e.g. iron compounds, remain quantitatively in the liquid phase. Thus it can be seen that an additional advantage of the process lies in that it is suitable for use when starting with fairly cheap crude materials.

Zirconium tetraacetate is highly water-soluble, zirconyl acetate and acetic acid being formed upon dissolution, so that highly concentrated solutions free of alkali can be produced. This property is very important for its utilization because only solutions free of alkali of this compound are resistant to hydrolysis even on heating to near the boiling point. Moreover, anhydrous zirconium tetraacetate is soluble, with addition of small amounts of free acetic acid, in various solvents, as for example ethyl acetate, acetone, etc., so that this compound can be used also when operating in non-aqueous phase. Moreover, zirconium tetraacetate can easily be transformed into high-grade zirconium tetra-soaps of higher fatty acids, e.g., zirconium octoate zirconium stearate, etc.

According to the process of the invention, it is, of course, possible also to use, in addition to the zirconium chlorides, the respective bromides or iodides as starting material. In some instances this might not be too desirable economically. Further according to the process of the invention, the tetraacetate may be produced from hafnium compounds. Thus the tetraacetate of hafnium can be prepared starting from hafnium tetrachloride or hafnium oxychloride $HfOCl_2.8H_2O$ etc. and following the same procedure disclosed above in connection with the zirconium compounds.

The process according to the invention is in particular not limited to chemically pure zirconium compounds which are known to be of importance in many nuclear physics processes, but it relates also to the respective "ordinary" hafnium-containing zirconium compounds.

In order that those skilled in the art may better understand the method of the present invention and in what manner the same may be carried into effect, as well as providing basis for the preferred conditions hereinabove set forth, the following specific examples are offered:

*Example 1*

1500 cc. of anhydrous acetic acid and 470 g. of zirconium tetrachloride having an iron content of 0.1% $Fe_2O_3$ are heated in a round flask, provided with a sturdy agitator, a filling tube, and a single column with condenser and receiver for a period of 15 to 20 minutes to 60° C. and the reaction mixture agitated during the heating. The zirconium tetrachloride goes into solution with evolution of hydrogen chloride. Thereafter 1700 cc. of acetic anhydride are added to the reaction mixture maintained at 60 to 65° C., a violent evolution of hydrogen chloride again taking place. Subsequently, at a pressure of 40 to 50 mm. Hg and at a temperature of 60° C., 1400 to 1500 cc. of liquid are distilled over in the course of 1½ to 2 hours. Very shortly after the distillation has been instituted, the zirconium tetraacetate starts to precipitate out, so that in the end a thick paste is formed. While stirring, the paste is allowed to cool in the course of 2 to 3 hours and the liquid is suction-filtered from the solid phase. After the filtration, the precipitate contains 35 to 36% of $ZrO_2$. The zirconium tetraacetate precipitate is dried at 80 to 85° C. with exclusion of moisture. 640 g. of iron-free zirconium tetraacetate having a content of 38% $ZrO_2$ and 0.05% Cl is recovered. The distillate, consisting essentially of hydrogen chloride-containing acetic acid, and the filtrate, consisting for the most part of acetic anhydride, can be regenerated by fractionation procedures.

*Example 2*

Following the procedure described in Example 1, zirconium tetrachloride is first reacted with acetic acid and then with acetic anhydride, only 1000–1100 cc. of liquid instead of 1400–1500 cc. are however distilled over. The reaction mixture is cooled down to about 20 to 25° C., and to the cooled reaction mixture there is added in the course of ½ to 1 hour, in small portions, 110 g. of a 30% hydrogen peroxide under stirring, at which under the exothermic reaction conditions, elementary chlorine escapes and a portion of the acetic anhydride is saponified to acetic acid. Thereafter the pasty mass is heated at atmospheric pressure to 95 to 105° C., while stirring and maintained at this temperature for 10 to 15 minutes. After cooling, processing is effected substantially as described in Example 1. There are obtained 635 g. of iron- and chlorine-free zirconium tetraacetate containing 38% of $ZrO_2$.

*Example 3*

290 g. of zirconium oxychloride ($ZrOCl_2.6H_2O$) are dissolved in 1700 cc. of acetic anhydride, an amount of acetic anhydride equivalent to the water and oxygen content of the oxychloride being saponified to acetic acid, and hydrogen chloride escaping with formation of monochlorotriacetatozirconylacetic acid. Thereafter, 500 to 600 cc. of liquid are distilled over the agitation at normal atmospheric pressure and at a temperature of 110 to 120° C., more and more zirconium tetraacetate being precipitated. After cooling, the pasty mass is processed as described in Example 1. There are obtained 320 g. of zirconium tetraacetate containing 38% or $ZrO_2$ and 0.05% of chlorine.

*Example 4*

240 g. of high-polymeric zirconium oxychloride containing 52% of $ZrO_2$ and 26.2% of chlorine are dissolved in a mixture of 700 cc. of acetic acid and 1000 cc. of acetic anhydride, the resulting solution, recognizable by its higher viscosity, containing besides monomeric also polymeric chlorozirconyl-acetato compounds. Under reduced pressure at 60 to 70° C., 500 cc. of liquid are distilled over, zirconium tetraacetate being precipitated with elimination of hydrogen chloride and deomposition of the polymeric zirconium compounds. The processing after the distillation is repeated as has been described in Example 1. There are obtained 315 g. of zirconium tetraacetate containing 38.5% of $ZrO_2$ and 0.07% of chlorine.

While there have been described various embodiments of the invention, the methods described are not intended to be understood as limiting the scope of the invention as is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

While we have described the utilization of zirconium chlorides in particular as starting materials, it will be understood that any zirconium halide and in fact any halide of a metal of the IV group of the periodic table of elements, i.e. hafnium, zirconium, titanium capable of reaction with acetic acid under any desired conditions could be used with advantage for the production of crystalline tetraacetates of the respective metal compound. These advantages result, in fact, when the metal halide and acetic acid are converted to the crystalline tetraacetate salts suitable for any desired subsequent operation.

Having thus described the invention, what is new and desired to be secured by Letters Patent is:

1. A process of preparing zirconium tetraacetate, which comprises dissolving zirconium tetrachloride in glacial acetic acid while heating to about 50–65° C., whereby an intermediary compound in the solution of the formula $$ZrCl_2(CH_3COO)_2 \cdot xCH_3COOH$$

wherein $x$ has a value of 3 and 5, is formed, reducing the hydrogen concentration in the solution by adding thereto acetic anhydride, again heating the solution to about between 50–65° C., distilling free acetic acid and evolved HCl from the solution, whereby zirconium tetraacetate crystallizes, separating said zirconium tetraacetate and drying said zirconium tetraacetate under the exclusion of moisture.

2. A process of preparing zirconium tetraacetate which comprises, heating zirconium oxychloride of the formula $ZrOCl_2 \cdot nH_2O$, wherein $n$ is an integer between 2 and 8, with acetic anhydride to a temperature of about between 50–65° C., whereby a portion of said acetic anhydride is hydrolyzed to acetic acid, distilling free acetic acid and HCl from the reaction mixture whereby zirconium tetraacetate crystallizes from the reaction mixture, separating said crystallized zirconium tetraacetate and drying said zirconium tetraacetate under the exclusion of moisture.

3. A process of preparing zirconium tetraacetate which comprises heating a member of the group consisting of polymeric zirconium oxychlorides and basic zirconium oxychlorides with a mixture of glacial acetic acid and acetic anhydride to a temperature of about 50–65° C., distilling free acetic acid from the reaction mixture, whereby zirconium tetraacetate crystallizes, separating said zirconium tetraacetate and drying said zirconium tetraacetate under the exclusion of moisture.

4. The process claimed in claim 1, wherein traces of chlorine remaining in the reaction mixture after distillation of free acetic acid are removed by treatment with an oxidizing agent.

5. The process claimed in claim 4, wherein the oxidizing agent is $H_2O_2$.

6. A process of preparing zirconium tetraacetate, which comprises, heating to a temperature in the range of about between 50 to 65° C. a solution of a complex dichlorozirconyl acetic acid compound of the formula $ZrCl_2(CH_3COO)_2 \cdot xCH_3COOH$ wherein $x$ has a value between 3 and 5, in a mixture of glacial acetic acid and acetic anhydride, removing free acetic acid from the solution by distillation, whereby the hydrogen ion concentration in the solution is reduced, said complex compound is decomposed and rapid substitution of chlorine atoms by acetate groups takes place, to produce precipitating crystalline zirconium tetraacetate, separating said zirconium acetate from remaining acetic anhydride and drying said zirconium tetraacetate under exclusion of moisture.

7. A process as claimed in claim 6, wherein said complex compound is obtained by dissolving zirconium tetrachloride in glacial acetic acid.

8. A process as claimed in claim 6, wherein said complex compound is obtained by dissolving $ZrOCl_2 \cdot nH_2O$, wherein $n$ stands for an integer between 2 and 8 inclusive, in acetic anhydride.

9. A process as claimed in claim 6, wherein said complex compound is obtained by dissolving basic and polymeric zirconium oxychlorides in a mixture of glacial acetic acid and acetic anhydride.

References Cited in the file of this patent

FOREIGN PATENTS 800,160    Great Britain _____ Aug. 20, 1958

OTHER REFERENCES

Pande et al.: "Journal für Praktische Chemie," vol. 5, Nos. 1–2, October 1957, pp. 101–104 relied on.

Larson: "Journal of the American Chemical Society," vol. 82, pp. 1223–1225, March 5, 1960.